Patented Aug. 19, 1930

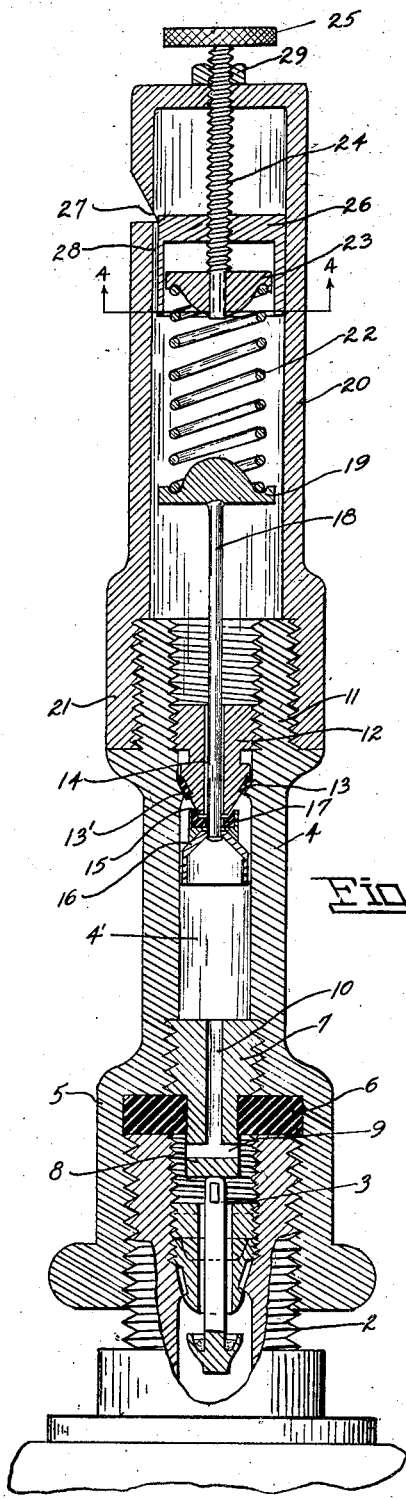
Aug. 19, 1930.  W. L. GALBRAITH  1,773,394
TIRE DEFLATION SIGNAL
Filed Feb. 27, 1929
Warren L. Galbraith *Inventor*
By *Herbert E. Smith*
*Attorney*

1,773,394

UNITED STATES PATENT OFFICE

WARREN L. GALBRAITH, OF DEER PARK, WASHINGTON, ASSIGNOR OF ONE-FOURTH TO ORNA M. FAHEY, ONE-FOURTH TO ARMOND M. BAUMP, AND ONE-FOURTH TO ALBERT H. TAYLOR, ALL OF SPOKANE, WASHINGTON

TIRE-DEFLATION SIGNAL

Application filed February 27, 1929. Serial No. 343,224.

My present invention relates to an improved tire deflation signal of the type adapted for use with vehicles, and involving means for giving warning by an audible signal, as a whistle, when the pressure within the pneumatic tube or pneumatic tire of an automobile wheel, is reduced below a normal, predetermined pressure, either by puncture, leakage, or otherwise.

The device of my invention is adapted for use with the standard types of tire valve devices now in use on pneumatic tires and it may readily and with facility be substituted for the customary cap employed to close the exteriorly threaded valve tube of the tire.

The invention consists in certain novel combinations and arrangements in the signal device, including a signal valve that is held normally closed by the air pressure of the tire, which is automatically opened if and when the pressure in the tire reaches a predetermined minimum, and means are provided whereby air pressure past the opened valve will sound the audible signal or whistle as a warning.

In the accompanying drawings I have illustrated one complete example of the physical embodiment of my invention wherein the parts are combined and arranged according to one mode I have thus far devised for the practical application of the principles of my invention. Figure 1 is a view showing the device in use.

Figure 2 is a longitudinal sectional view of the signal device as applied to a tire valve. Figure 3 is an enlarged, detail, sectional view of the signal valve. Figure 4 is a transverse sectional view at line 4—4 of Figure 2.

To illustrate the utility of the signal device and its relation to the pneumatic tube of a tire I have shown such a tube as 1 in Figure 1, provided with the usual air valve device that includes the exteriorly threaded valve sleeve 2 and the depressible valve stem 3. In adapting my device for use, the customary cap is removed from the threaded valve sleeve and the signal device is substituted in lieu thereof.

The signal device comprises a signal tube 4 having an air equalizing chamber 4' and an interiorly threaded bell or head 5 that screws onto the threaded valve sleeve 2 as shown, and a packing washer 6 is interposed between the sleeve and head to insure an air tight joint.

The head 5 of the signal tube is also provided with inner threads to receive a threaded plug 7 which is fashioned with a projecting boss 8 that engages against the end of the tire-valve stem 3 for the purpose of depressing the stem and slightly opening the tire valve. Thus when the signal tube is screwed on the valve sleeve, the boss engages the stem 3, slightly, opening the tire valve, and air under pressure from the tire tube is permitted to pass through a lateral port 9 of the boss, and thence through a longitudinal passage 10 in the plug to the equalizing pressure chamber 4' of the signal tube.

At its end opposite the attaching-head 5, the signal tube is fashioned with a collar 11 which is threaded both interiorly and exteriorly, and its interior bore is substantially the same as that of the pressure chamber 4'. The interior threads are adapted to receive an exteriorly threaded valve plug 12 that is rigidly fixed in the end of the signal tube and provided with a tapering or conical packing ring 13 which frictionally engages against a complementary shoulder 13' within the signal tube at one end of the pressure chamber 4'.

The valve plug 12 has a central opening or bore 14 extending therethrough, and the end 15 of the tapered head is adapted to receive a signal valve that normally closes the opening or passage 14. The signal valve 16 is hollow and fits neatly within the pressure chamber 4', and a countersunk packing ring 17 is provided for the valve that is adapted to frictionally engage the end of the tapered head 15 and close the air passage 14 of the valve plug.

The signal valve is carried at one end of the stem 18 which passes through the bore 14 of the valve plug and is of less diameter than the bore to afford means for passage of air therethrough when the signal valve is removed from the head or tapered end 15 of the plug. At its opposite end the signal valve stem is provided with a fixed head 19 which projects into the interior of the signal pipe 20. This signal pipe has an open end 21, with interior threads that screw upon the exterior threads of the collar 11 of the signal tube and forms a rigid structure therewith. The head 19 supports one end of a spring 22 that is interposed between the stem-head and an adjustable head 23 carried at one end of an adjusting screw 24, threaded in the closed end of the signal pipe and provided with an exterior thumb knob 25. The adjustable spring head 23 is guided in a hollow bushing 26 fixed within the signal pipe adjacent a vent opening 27, and a flat face 28 on the exterior periphery of the bushing provides a passage from the interior of the signal pipe to the port or vent opening 27 and thus to the atmosphere.

The tension of the spring 23 may be adjusted by turning the thumb knob 25 and its screw 24, and then the screw may be locked in adjusted position by the use of a lock nut 29 exterior of the closed end of the signal pipe. The tension of the spring is adjusted with relation to the air pressure within the tire tube and the pressure chamber 4' of the signal tube, it being understood that the pressure in these two tubes is normally equalized. If the pressure of air in the tire tube is to be say 55 pounds, then the tension of the spring 22 is adjusted so that the spring will overcome an air pressure of 54 pounds. If the pressure in the tire tube and chamber 4' falls below 55 pounds to 54 pounds, the spring forces the valve 16 from its seat against the head 15, and air under pressure then passes through the bore 14, through signal pipe 20 and the conduit between the bushing 26 and the signal tube, to and through the port 27 with a whistling noise. The alarm or warning is thus sounded and continues until the tire is deflated, or the air pressure otherwise discontinued through port 27.

Having thus fully described my invention, what I claim as new and desire to secure by Letters Patent is:—

In a signal device the combination with an attaching tube and valve-opening means carried thereby, of a signal pipe forming a cap and secured on the tube, a valve-plug fixed in the tube and provided with a tapered head, a signal valve in the tube having a packing seat normally engaging the tapered head to close the valve-plug, a stem for the signal valve extending through the plug and a head on said stem located in the signal cap, a screw mounted in the end of the cap and a head on the screw within the cap, a spring interposed between the two latter heads, and sound-producing means fashioned in a wall of the cap.

In testimony whereof I affix my signature.

WARREN L. GALBRAITH.